United States Patent [19]

Clover et al.

[11] 4,216,541
[45] Aug. 5, 1980

[54] ERROR REPAIRING METHOD AND APPARATUS FOR BUBBLE MEMORIES

[75] Inventors: Richmond B. Clover, Sunnyvale; George J. Miller, San Jose, both of Calif.

[73] Assignees: Intel Magnetics Inc.; Intel Corporation, both of Santa Clara, Calif.

[21] Appl. No.: 948,666

[22] Filed: Oct. 5, 1978

[51] Int. Cl.$^2$ ............... G06F 11/12; G11C 29/00
[52] U.S. Cl. ............................ 371/38; 365/1; 371/13
[58] Field of Search ............... 235/312, 302.3, 303.2; 340/146.1 AL; 365/1, 200, 201

[56] References Cited

U.S. PATENT DOCUMENTS

| | | | |
|---|---|---|---|
| 3,814,922 | 6/1974 | Nibby et al. | 235/303.2 |
| 3,825,893 | 7/1974 | Bossen et al. | 235/312 |
| 4,037,091 | 7/1977 | Beuscher | 235/312 |
| 4,053,751 | 10/1977 | Ault | 365/1 |
| 4,151,510 | 4/1979 | Howell et al. | 340/146.1 AL |

OTHER PUBLICATIONS

Barshun and Olderdissen, Avoidance of Soft Fail Accumulation, IBM Technical Disclosure Bulletin, vol. 20, No. 8, Jan. 1978, pp. 3187–3188.

Primary Examiner—Charles E. Atkinson
Attorney, Agent, or Firm—Blakely, Sokoloff, Taylor & Zafman

[57] ABSTRACT

An error repairing method and apparatus for a magnetic bubble memory for restoring stored binary data to its original form are described. The method and apparatus are employed to compensate for random error in bubble memories resulting from slipped or disappeared bubbles. The data is coded with an error correcting code, such as a Hamming or Fire code, before storage. The stored, coded data is periodically read from memory and errors are detected and corrected. The corrected, coded data is rewritten into memory. In one embodiment the frequency of the repair cycles is a function of the rate at which errors are detected.

3 Claims, 3 Drawing Figures

ERROR REPAIRING METHOD AND APPARATUS FOR BUBBLE MEMORIES

BACKGROUND OF THE INVENTION

1. Field of the Invention

The invention relates to error detecting and correcting methods and apparatuses, particularly for bubble memories.

2. Prior Art

During the reading, writing and shifting of binary data in a magnetic bubble memory, a predictable number of bubbles either slip in position or disappear. This, of course, results in loss or distortion of the stored data. These failures, with current state-of-the-art bubble memories, are random and moreover, not attributable to identifiable circuit defects. They occur more frequently when the memory is operated near its maximum or minimum operating temperature. Memory start-up and shut-down, in addition to bubble shifting (e.g. data circulation) increases the chances of such failures. In a 256K memory under normal operating conditions, one failure every few operating hours is well within the order magnitude of expected failures. These failures, however, will increase markedly at high or low temperatures, several thousand times this normal operating failure rate may occur at operating temperature extremes.

Cyclic codes for detecting errors in binary data and for permitting the correction of such errors have been known for a number of years. For example, such codes are discussed in "Cyclic Codes for Error Detection" by W. W. Peterson and D. B. Brown, *Proceedings of the I.R.E.*, January, 1961, beginning at page 229. Such codes are typically used to correct data as blocks of data are read from a memory into a system. These codes are also used to encode data for transmission, particularly over long distances, to permit the detection and correction of errors which result from the sensing of low level signals.

The present invention expands upon the use of error correcting codes. A code is used in the present invention to periodically repair data in memory as will be described in greater detail.

SUMMARY OF THE PRESENT INVENTION

A method for repairing data stored in a magnetic bubble memory is described. The data is coded with an error correcting code so as to permit the detection and correction of at least one error in the data. The data is then written into a bubble memory in an ordinary manner to store the coded data. The coded data is periodically read from the memory and examined for errors. These errors are corrected and the data is then rewritten into the memory. The rewriting of the corrected data into the memory, in effect, repairs the data and assures the integrity of the data against the expected random failures.

DETAILED DESCRIPTION OF THE INVENTION

A method and apparatus for repairing data stored in a magnetic bubble memory is described. In the following description, specific details, such as specific number of loops, etc., are set forth in order to provide a thorough understanding of the present invention. However, it will be obvious to one skilled in the art that the invention may be practiced without these specific details. In other instances, well-known coding techniques, circuits and processes have not been described in detail in order not to obscure the present invention in unnecessary detail.

Figure 1:
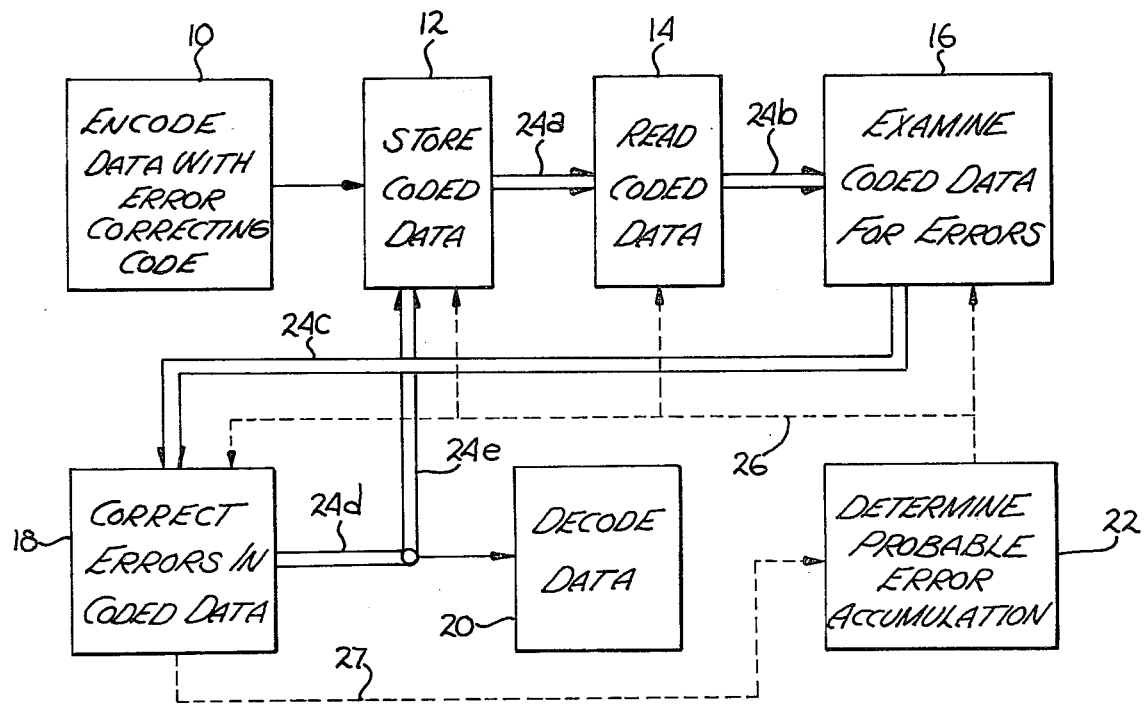
FIG. 1 is a flow diagram illustrating the steps in the presently preferred method.

Referring to FIG. 1, the method of the present invention includes, first encoding the data with an error correcting code as illustrated by block 10. In the presently preferred embodiment, blocks of data (256 bits) are examined and encoded with an error correcting code. This code may be interspersed or integrated within an enlarged block or may consist of a separate field. These 256 bit blocks of data provide a sufficiently large data base to economically employ an error correcting code. For example, with 14 additional bits, a burst error of five bits in the data block may be detected and corrected. With the anticipated error rate of a magnetic bubble memory, the ability to correct such errors is sufficient to assure very high reliability without requiring frequent repair cycles. Anyone of a plurality of well-known error correcting codes may be employed, such as the Hamming and Fire codes or other cyclic redundancy check codes. See, for example, *Error Correcting Codes*, Wiley, New York, 1961 by W. W. Peterson.

After the encoding of the data, the data with the errorcorrecting code (hereinafter referred to as "coded data") is stored in the bubble memory as shown by block 12. Periodically, the coded data is read from the memory as indicated by block 14. This coded data is then examined to determine if errors have occurred as indicated by block 16. The errors in the data are corrected as shown by block 18. Assuming that an error has occurred in a given block of data, this error is corrected and the data restored to the condition it was in when it was stored. The corrected coded data is then restored as indicated by the flow lines 24d and 24e.

In typical prior art use of coded data, the data is corrected as decoded to return the data to its original form as indicated by block 20 without returning the data for restorage.

Thus, with the method of the present invention, a closed repair loop is established as indicated by the double lines 24a, 24b, 24c, 24d, and 24e. The steps illustrated by blocks 14, 16, 18, and 12 are periodically repeated (in that order) for each repair cycle to assure the continuing integrity of the stored data.

A number of criteria may be employed to determine the frequency of these repair cycles. In a 256K bit memory, a typical repair cycle may take in the order of seconds to complete, therefore, the frequency of such cycles must be controlled in order not to interfere with accessing of the memory. Since it is known that failures will accumulate within the memory when the memory is on, that is when the in-plane, rotating magnetic field is present as opposed to a static condition, "on-time" may be a consideration. For example, a repair cycle may occur once per hour of memory operation. However, this criterion does not take into consideration the stresses to which the memory may be subjected due to ambient conditions, or other conditions such as power supply fluctuations.

One ideal time to repair the data is at memeory power-down since at this time interference with accessing of the memory is not a concern. A repair cycle may also be conducted on memory start-up, particularly to correct errors associated with such start-up. Also, repair cycles may be performed during inactive periods. For example, a signal may be coupled to the memory indicating an inactive period, thereby initiating a repair cycle.

In typical memory operation when the memory is being accessed, errors will be corrected before data is coupled to an external bus. The rate at which such errors are detected is readily determined (line 27) and when such error rate excceds a perdetermined rate, a demand flag set indicating that a memory repair cycle is required. This flag may be employed to give notice to the system operator or to initiate an interrupt (line 26) which automatically permits a repair cycle to be conducted. The criterion for determining the frequency of repair cycles has the advantage that it is based on actual errors. Thus, effectively, consideration is given to conditions such as ambient temperature or other stress inducing conditions without requiring direct sensing of these conditions.

Figure 2:
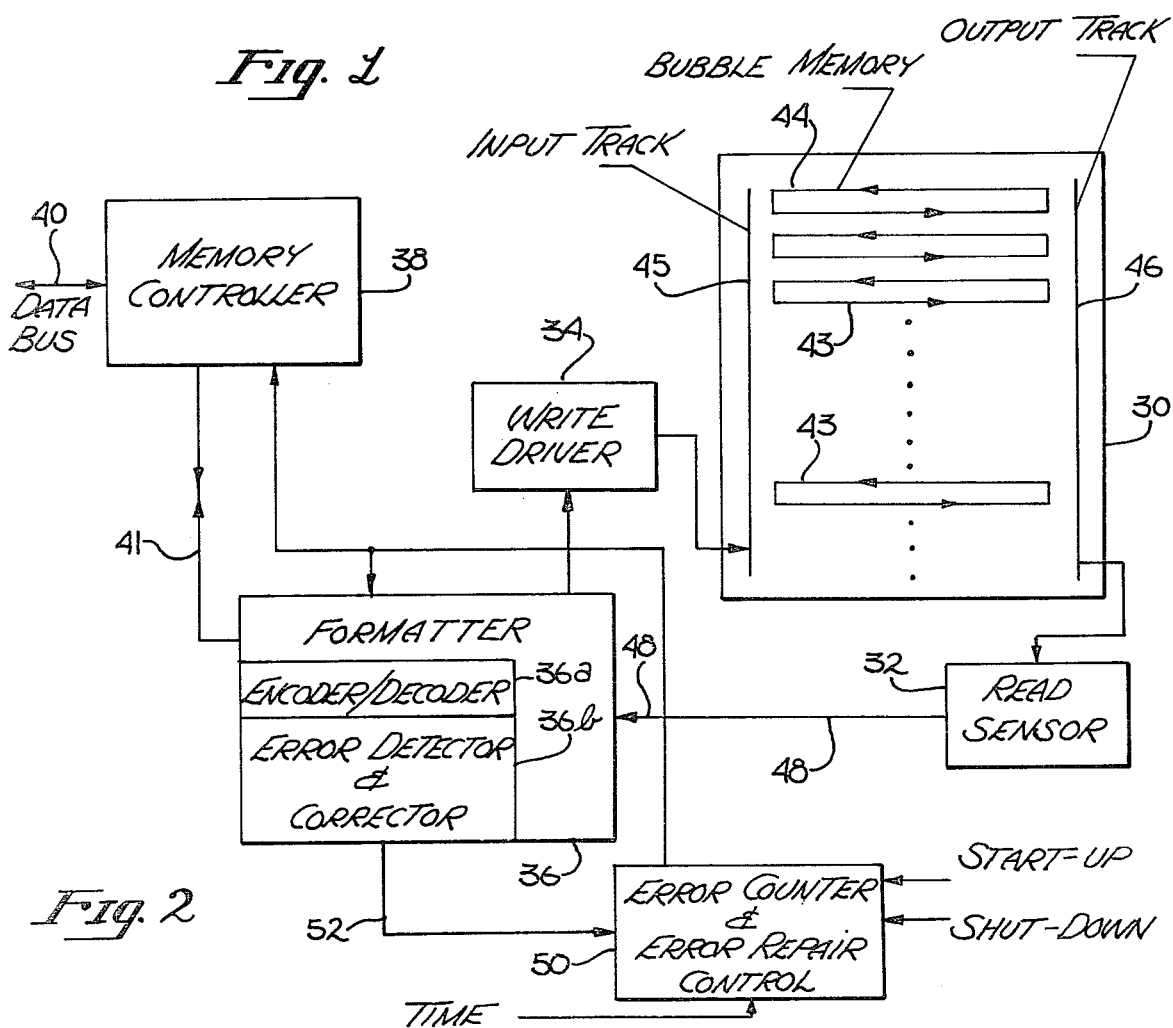
FIG. 2 is a block diagram of a bubble memory embodying the method of FIG. 1.

Referring now to FIG. 2, the pertinent portions for purposes of the present invention of the memory includes the bubble memory device 30 with its read sensor 32 and a write driver 34. Both write driver 34 and read sensor 32 communicate with a formatter 36. The memory controller 38 interconnects the formatter 36 with the data bus 40 through a bidirectional bus 41.

In the presently preferred embodiment, the memory device 30 is fabricated in a well-known manner on a garnet substrate, specifically a gadolinium gallium garnet ($Gd_3 Ga_5 O_{12}$). An ion implanted magnetic garnet (epitaxial layer) is employed on this substrate for the magnetic storage layers. Aluminum alloy conductors are fabricated on a silicon dioxide layer which is formed over the storage layer. Permalloy patterns employing asymmetric chevrons are formed on a silicon dioxide layer which covers the conductors. A permanent magnetic field and an in-plane, rotating magnetic field are employed in an ordinary manner with the device 30.

The memory device 30 is orgainzed in a well-known manner into a plurality of parallel stored loops 43 which are disposed between a transverse input track 45 and output track 46. Each of the loops 43 are interconnected with an input track 45 through a swap gate; the loops are coupled to the output track 46 through a transfer gate or replicate gate. For the 256K memory approximately 316 loops are fabricated on the device 30 where each loop includes a useable 1,000 spaced-apart bubble positions. After fabrication, the loops are tested and 265 operative loops identified for data blocks. Also, 14 additional operative loops are likewise identified for the expanded blocks required for the correcting code. The information identifying the operative loops is stored on a bootstrap loop 44.

In typical operation, during a read cycle, bubbles in each loop (where present) are simultaneously transferred to, or replicated on, the output track 46. Then the presence or absence of these bubbles is serially sensed by sensor 32 and converted into a binary electrical signal. In a similar manner, the binary ones and zeros designated for storage in device 30 are serially coupled to the write driver 34. Bubbles are serially formed on input track 45 and then simultaneously written into the loops 43.

The formatter 36 performs well-known functions including the receiving of the data from the controller 38 and formatting of the data for storage in the memory device 30. On start-up, the information stored in the bootstrap loop 44 is communicated to the formatter in order to permit storage and retrieval of data from the operative loops.

In the presently preferred embodiment, the formatter 36 also performs the function of encoding the data with the error correcting codes prior to the storage of the data and decoding the data prior to its coupling to the controller 38. This function is performed employing well-known circuitry in the encoder/decoder 36a. Thus, the formatter performs the step indicated by block 10 of FIG. 1. The formatter includes circuitry for the detection and correction of errors within the error detector and corrector 36b. Again, known circuits may be employed.

All incoming data is encoded and stored by coupling to the memory device 30 through the write driver 34 and input track 45. When the coded data is read from the memory, the formatter 36 decodes the data, that is, returns it to its original state for communication to the data bus 40 through bus 41 and the controller 38.

Periodically, when a repair cycle is initiated, data is circulated to correct errors. Through use of ordinary addressing means, each position of the loops (each block of data) is sequentially accessed for repair. Within the formatter 36 and more particularly within the error detector and corrector 36b, the errors are detected and corrected. Then the data is rewritten into the memory device (at its prior location) via the input track 45.

The error counter and error repair control means 50 controls the repair cycles. An ordinary timer may be employed if the repair cycle is to occur periodically based on a predetermined period of memory on-time. For example, the timer may be activated by the power supply for the memory and provide a signal indicating when the memory should be repaired or actually initiate an interrupt to permit a repair cycle. Also, relatively simple logic circuits may be employed to cause a memory repair cycle at start-up and/or shut-down.

The presently preferred repair criterion for memory repair cycles (in addition to shut-down) is that based on the number of errors detected in a given time. During operation of the memory it is assumed that data will be accessed and prior to the coupling of data to bus 41, errors will be detected and corrected. A signal indicating the detection of an error is coupled to mean 50 via line 52. These error indicating signals may, for example, be counted in a 2-bit counter which is cleared every few hours of memory on-time. If the counter overflows, a flag is set indicating that a repair cycle is required. As mentioned, either an operator indication may be given or a memory interrupt initiated allowing sufficient time for a repair cycle to occur.

Figure 3:
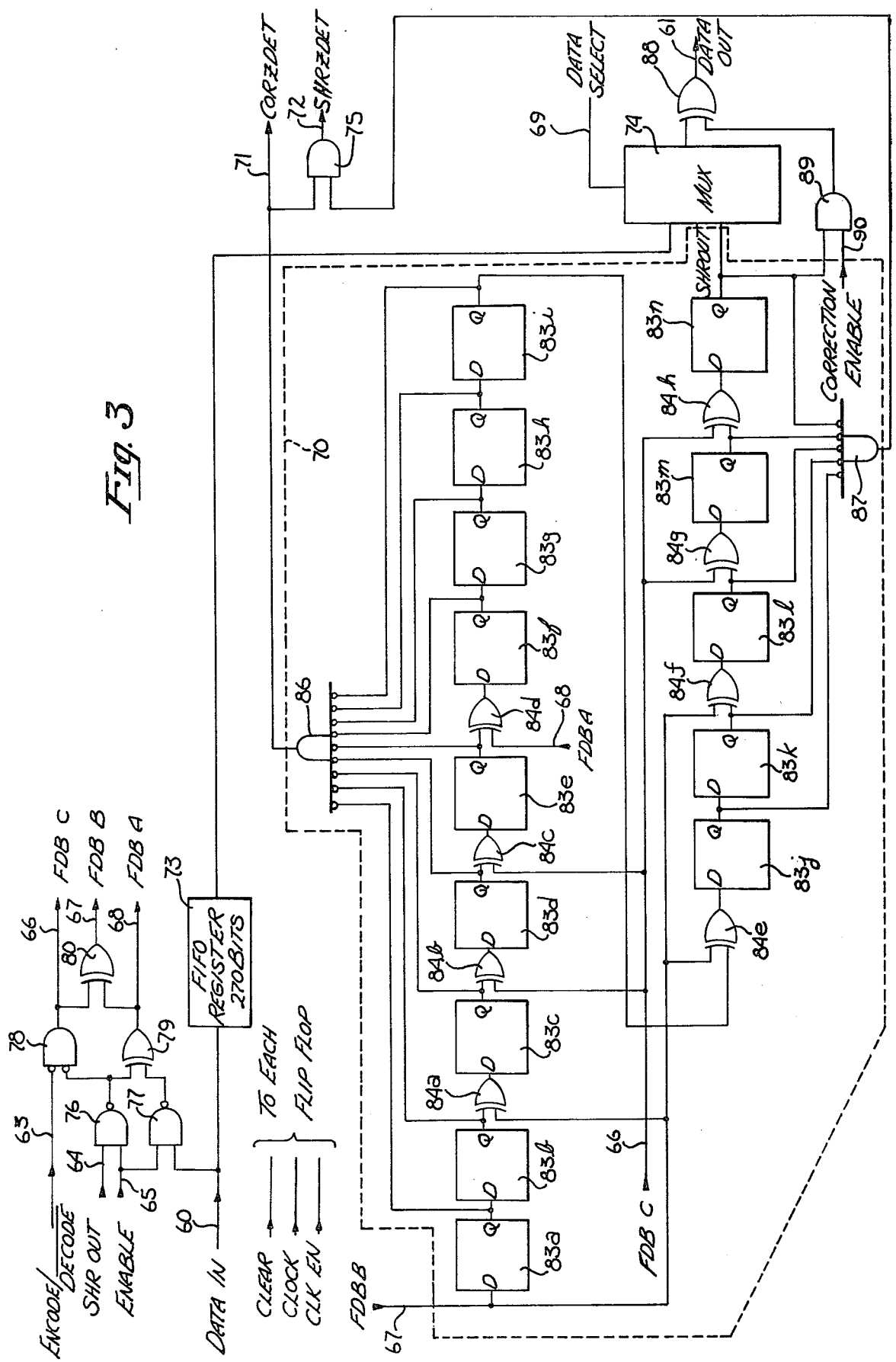
FIG. 3 is a block diagram of a specific circuit for encoding, decoding and correcting errors which may be employed in the memory of FIG. 2.

While any one plurality of known circuit means may be employed for encoding and decoding data and for error detection and correction of data, a specific embodiment which represents the presently preferred embodiment is shown in FIG. 3. In general, the circuit includes a data-in line 60 and a data-out line 61. The data flows into the first-in/first-out (FIFO) register 73 and is then clocked out through the multiplexer 74 onto the data-out line 61. A 14 bit shift register 70 (shown within the dotted line) includes a plurality of bistable circuits (flip-flops 83a through 83n). This register generates the error-correcting code and is used for detecting and correcting errors.

The shift register 70 employs three feedback signals identified as FDB A, FDB B, and FDB C. These signals are generated by the logic gates shown in the upper left-hand corner of FIG. 3. The NAND gate 78 receives an encode/decode signal on line 63. A register output command signal (SHR OUT) is coupled to one input terminal of the NAND gate 76. The other terminal of the NAND gate 76 receives an enable signal on line 65. The data-in signal from line 60 is coupled to one input terminal and a NAND gate 77. The outputs of the NAND gates 76 and 77 are coupled to the inputs of an exclusive OR gate 79. The output of this gate provides one feedback signal FDB A on line 68. The output of this gate along with the output of gate 78 are coupled to the input terminals of an exclusive OR gate 80. The output of this gate, line 67, provides the second feedback signal (FDB B). The output of the gate 78, line 66, provides the third feedback signal (FDB C).

The shift register 70 includes 14 stages each of which comprises a D-type flip-flop. The first flip-flop 83a receives the feedback signal on line 67 at its D terminal. This feedback signal is also coupled through the exclusive OR gate 84a to the flip-flop 83c, through the exclusive OR gate 84e to the flip-flop 83j, and through the exclusive OR gate 87f to the flip-flop 83l. The feedback signal on line 68 is coupled to the D terminal of the flip-flop 83f through the exclusive OR gate 84d. The last feedback signal (FDB C), is coupled to the flip-flop 83d through the exclusive OR gate 84b, to the flip-flop 83e through the exclusive OR gate 84c, to the flip-flop 83m through the exclusive OR gate 84g, and to the flip-flop 83n through the exclusive OR gate 84h. Each of the flip-flops 83a through 83n also receive a clear, clock, and clock-enable signal.

The multiplexer 74 allows the selection of either the output of the FIFO register 73 or the output of the register 70 from flip-flop 83n. When a data select signal is present on line 69 the contents of the register 73 are shifted through the multiplexer 74 and gate 88 onto line 61. When the signal on line 69 is low, the contents of register 70 are shifted onto line 61. The other terminal of the exclusive OR gate 88 is coupled to the output of the AND gate 89. The inputs of this gate are the output of the last stage of the register and the correction enable signal.

Two zero detection signals are generated from the register 70. The signal on line 71 identified as CORZDET is high when the first nine stages of the register are zero. In order to generate this signal, the first nine stages of the register are coupled to line 71 through the NAND gate 86. Line 71 is also coupled to one input terminal of an AND gate 75. The last five stages of the register are coupled to the input terminals of the NAND gate 87. If the last five stages of the register contain zeros, then the output of gate 87 is high, and if the signal on line 71 is high, the output of gate 75 (line 72) is also high. Thus, the SHRZDET signal is an indication that zeros are present in all the stages of the register.

When encoding data, the encode/decode signal and the correction enable signal are both high. For the described embodiment 256 bits of data are serially coupled to the data-in line 60. The register 70 and FIFO register 73 are clocked (that is, the clock is enabled) once each time a valid input bit is coupled to the line 60. The input data may be sensed on line 61 when a signal is applied to the data select line 69 assuming the correction enable signal is low. After the 256 bits of data have been clocked into register 73, there will be a 14 bit correcting code stored in the register 70. This code may be clocked onto line 61 for storage along with the true data when the data select signal on line 69 is set to zero and the enable signal on line 65 is also set to zero. When this is done, the register 70 is clocked 14 times to transfer the correcting code out of the register. Note that when the signal on line 65 is low, the feedback signals on lines 66, 67 and 68 are likewise low and the register 70 simply shifts its contents without any effect from exclusive OR gates 84a through 84h.

To check data, the encode/decode signal and the correction enable signal are set low and the enable signal on line 65 is brought high. The 270 bits of encoded data (256 bits of true data and 14 bits of error correcting code) are clocked into register 73 on line 60. At the conclusion of 270 shifts, the register 73 is filled and a 14 bit result is present in the register 70. If this result is equal to zero, no errors have occurred and the data may be read from the output register 73. Note that this condition is sensed on line 72. If the signal on line 72 is not high, an error has been detected but further processing is required to determine if the error is correctable.

Assume an error has been detected, that is, a non-zero result is present in the register. Under these conditions, the encode/decode signal and correction enable signal (lines 63 and 90 respectively) are set to their low state. Moreover, the data-in line 60 is held low. The enable line 65 is set high. Then the following sequence is performed:

1. If CORZDET = 1, go to step 4 below.
2. Read one bit from register 73 and clock the register 70 (Data select = 1).
3. If 270 bits are read from register 73 and CORZDET remains low, an uncorrectable error has occurred.
4. A correctable error of burst length equal to or less than five bits has been found. The data in the rightmost five bits of register 70 must be exclusively ORed with the next five bits from register 73 to correct the block of data. At this time the SHR register is zeroed out and the rest of the data is read directly from the FIFO register 73. (Note that for convenience, since SHRZDET = "1", the data from the FIFO register may continue to be exclusively ORed with the output of the SHR register.)

To correct a block of data, the enable signal is set to its low state, correction enable to its high state and the rest of the data is transferred from register 73. The multiplexer 74 transfers the data onto line 61; however, as the register 73 and register 70 are clocked, the data is exclusively ORed with the output of the register 70 through gates 88 and 89.

A specific example will illustrate the error correcting algorithm implemented by the circuit of FIG. 3. Assume that the data-in signal on line 60, which is intended to be stored in the bubble memory consists of the following:

DATA = 000000 . . . 000001(256 bits, LSB = 1).

After encoding, the 14 bit error correction code would consist of the following:

01010000101010.

Now assume that this data has been stored and is read from the memory with an error. Assume the following is read from the memory:

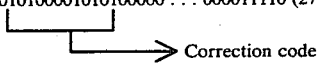

0101000010101000000 ... 000011110 (270 bits of data).

Correction code

The data read from memory has a five bit burst error in its least significant five bits. When this data is read into the register 73, the signal on line 72 would indicate that an error has been detected since the contents of the register 70 are equal to: 00000000011111. Since the first nine bits in register 70 are zero, it is immediately known that the first five bits to be read from register 73 are in error and must be exclusively ORed with the least significant five bits in the register 70, namely, 11111. After this exclusive ORing is accomplished, the data stream is returned to its original condition, that is:

0101000001010100000 ... 00001

If the data stream had an eight bit error burst, an error would have been detected, but after 270 clocks the CORZDET signal would have remained low indicating that the error pattern was uncorrectable.

The above-implemented algorithm was selected for its suitability for bubble memories; however, it has its shortcomimgs for other applications. Specifically, assume an error vector for the above-described data as follows:

EV=[000 ... 0100000010 .. 000]

The error vector represents a two bit error with a burst length of eight. The implemented algorithm will indicate that the error is correctable even though the correcting algorithm will complement the wrong two bits in the data stream during the correcting sequence, thus compounding the error. However, for bubble memories this type of error has an extremely low probability of occurrence. Therefore, the selected error correcting code provides an overall increase in performance of several orders of magnitude since it has been optimized for errors which are more probable for a bubble memory.

Thus, a method and apparatus has been disclosed which employs known error correcting codes to repair data in a magnetic bubble memory, thereby allowing reliable long-term storage in a memory where random failures are probable. One criterion for a memory repair cycle is the rate at which errors are detected. This criterion indirectly takes into account the operating conditions of the memory.

We claim:

1. In a magnetic bubble memory system which includes a magnetic memory device for storing data in the form of magnetic bubbles and writing means and reading means for writing data into said device and for reading data from said device, an improvement for detecting and correcting errors in data stored in said memory system comprising:

encoding means for receiving data to be stored in said memory and for encoding said data with an error correcting code to provide coded data, said encoding means coupled to said writing means;

error detection and correction means for examining said coded data to determine if an error is present in said coded data and for correcting said error, said error detection and correction means coupled to said reading means for receiving coded data and coupled to said writing means for rewriting said coded data into said device, said error detection and correction means comprising:

a first register for receiving blocks of said coded data;

a second register comprising a plurality of stages, each of which includes a bi-stable circuit;

a multiplexer coupled to receive the output of said first register and the output of said second register;

first logic means for generating a plurality of logic signals for said second register, said logic means coupled to receive said coded data, said plurality of logic signals being coupled to stages of said second register;

detection means coupled to said stages of said second register for detecting the binary state of signals in said second register;

second logic means for correcting errors in said data, coupled to the output of said multiplexer and coupled to receive signals from said second register, said second logic means coupled to said detection means for enabling said correction upon the detection by said detection means of predetermined binary state of said signals in said second register;

whereby errors in said coded data are detected and corrected.

2. The improvement defined by claim 1 wherein the interconnections between said bi-stable circuits of said second registers include exclusive OR gates, one of the inputs of said exclusive OR gates being coupled to receive the output of one of said stages and the other input of said gates coupled to receive one of said logic signals from said first logic means, the outputs of said exclusive OR gates being coupled to the input of the next succeeding one of said stages.

3. The improvement defined by claim 2 wherein said second logic means includes an exclusive OR gate coupled to said output of said multiplexer.

* * * * *

UNITED STATES PATENT AND TRADEMARK OFFICE
CERTIFICATE OF CORRECTION

PATENT NO. : 4,216,541

DATED : August 5, 1980

INVENTOR(S) : Richmond B. Clover and George J. Miller

It is certified that error appears in the above-identified patent and that said Letters Patent are hereby corrected as shown below:

Column 3, line 16, "perdetermined" should be -predetermined-.

Column 3, line 21, "The" should be -This-.

Column 5, line 13, "and" should be -of-.

Signed and Sealed this

Twentieth Day of October 1981

[SEAL]

Attest:

GERALD J. MOSSINGHOFF

Attesting Officer     Commissioner of Patents and Trademarks